Dec. 16, 1930.                J. C. REGAN                1,784,908
                           DIFFERENTIAL CHUCK
                           Filed May 28, 1928
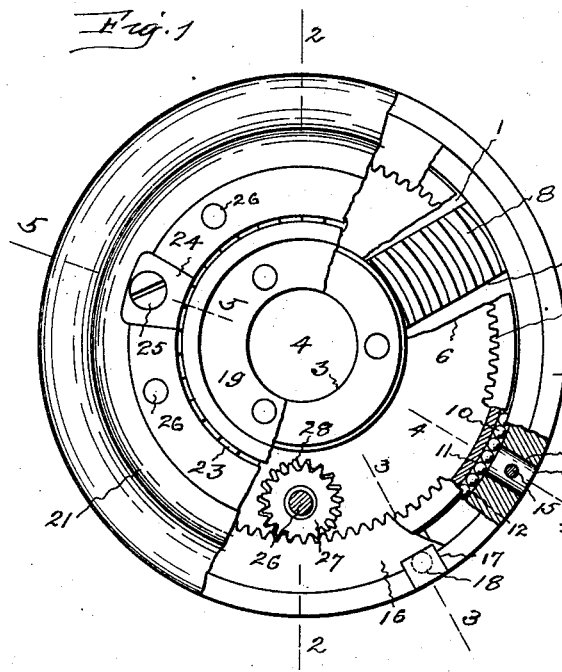
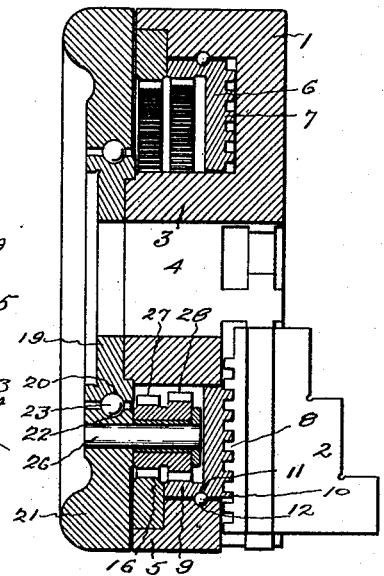
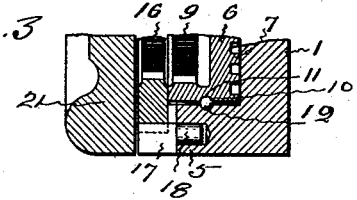
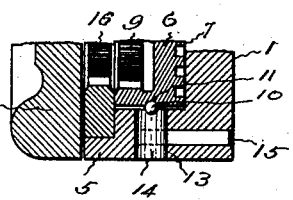
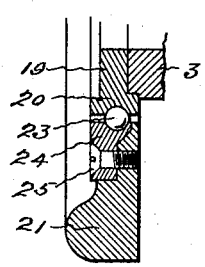
INVENTOR
Joseph C. Regan
by Harry R. Williams
atty.

Patented Dec. 16, 1930

1,784,908

UNITED STATES PATENT OFFICE

JOSEPH C. REGAN, OF WEST HARTFORD, CONNECTICUT, ASSIGNOR TO THE E. HORTON & SON COMPANY, OF WINDSOR LOCKS, CONNECTICUT, A CORPORATION OF CONNECTICUT

DIFFERENTIAL CHUCK

Application filed May 28, 1928. Serial No. 281,065.

This invention relates to those chucks of the scroll type commonly known as power chucks, that is, chucks in which the jaw opening and closing scroll is rotated by differential gearing actuated from a wheel to which hand or other power is applied, the same being an improvement on the chuck illustrated in patent to Cutler 1,608,464.

The object of the invention is to provide a chuck of this character which will open and close very easily and quickly and that will have a powerful grip upon the piece to be held when closed, the elements of which chuck are so designed and combined that accurate fitting of the parts with a resulting increased efficiency, is ensured, and the labor incident to manufacture and assembling is much less than for similar chucks as previously made.

Of the accompanying drawings Fig. 1 is a view looking toward the rear face of a chuck that embodies this invention, with parts broken away to show the interior arrangement. Fig. 2 is a diametrical section on the plane indicated by the dotted line 2—2 on Fig. 1. Fig. 3 is a detail section on the plane indicated by the dotted line 3—3 on Fig. 1. Fig. 4 is a detail section on the plane indicated by the dotted line 4—4 on Fig. 1. Fig. 5 is a detail section on the plane indicated by the dotted line 5—5 on Fig. 1.

The body of the chuck has a circular front wall 1 with radial grooves in the face for receiving the jaws 2, a rearwardly extending hub 3 in the interior with a central opening 4, and an annular rim 5. In the space between the hub and rim is the disk 6 that on its front face has scroll teeth 7 which engage the teeth 8 on the inner edges of the jaws. The scroll disk also has on its back face an internal gear 9. The scroll disk is rotatably mounted on balls 10, the disk having a ball groove 11 around its periphery and the rim of the body having a ball groove 12 in its inner wall, for receiving the balls. Bored through the rim of the body is a hole 13 in which is fitted a plug 14. This plug has a transverse perforation and driven through a hole in the body into this perforation in the plug is a pin 15. In manufacturing this structure the plug is fitted into the hole in the body and is fastened in place by the pin before the ball groove is cut in the inner wall of the body. After the ball groove has been cut around the inner wall of the body and also in the end of the plug the pin is withdrawn and the plug removed. In assembling the parts the scroll disk is placed in position and the balls dropped through the plug opening. After the ball race has been filled the plug is returned and the pin driven in to hold it in place, making a continuous anti-friction support for the scroll disk which is also locked in position by the bearing balls.

An annular gear 16 is fastened in the opening in the rear face of the body. This annular gear is locked in place by a key 17 that is held in position by a pin 18 that enters a socket in the body. Attached to the hub of the body is a back plate 19, in the rim of which is a ball groove 20. Surrounding the back plate is an annular hand wheel 21 with a ball groove 22 in its inner wall. Balls 23 are inserted in these grooves between the hand wheel and the rim of the back plate to provide anti-friction bearings for the hand wheel which is also locked in position by these balls. A block 24 is fastened by a screw 25 in a pocket on the outer face at the inner edge of the hand wheel, and when the ball groove is turned in the hand wheel it is also formed in this block. After the block has been grooved it is removed and the space formed by the grooves in the edge of the back plate and the inner wall of the hand wheel is filled with balls which are inserted through the pocket. The block is then set in place and secured by the screw.

Rotatably mounted on arbors 26 projecting inwardly from the hand wheel are a pinion 27 that meshes with the annular gear 16 which is keyed to the body, and a pinion 28 that meshes with the annular gear 9 in the scroll disk. One of these pinions has more teeth than the other so that upon turning the hand wheel the pinion of smaller diameter running in the annular gear keyed to the body and the pinion of larger diameter engaging the gear in the scroll disk, produces a differential movement between the hand wheel and the scroll for opening and closing the jaws.

In assembling these elements the scroll disk is placed in the opening in the body and the balls which form the anti-friction bearing and lock for the scroll disk are inserted through the body, after which the plug is placed in position and secured by the pin. The annular gear is set into the body and locked by the key, and the hand wheel with the differential pinions, is applied to the end of the body. The back plate is then secured in position, after which the hand wheel bearing balls are inserted so as to support and lock the hand wheel in position, and finally the pocket through which the hand wheel bearing balls are inserted is closed. When the hand wheel is in place the key which locks the annular gear into the body is prevented from coming out. By this construction the moving parts are not only supported and locked in place by the antifriction balls, but these balls are readily inserted from the exterior of the chuck and held in place so that they act efficiently, and yet at any time that it becomes necessary, entrance to the ball grooves is readily had for the substitution of new balls for those which become worn or broken, and this can be done without disassembling the structure.

The invention claimed is:

1. A chuck having a body carrying radially movable jaws and a rotatable scroll disk for opening and closing the jaws, balls interposed in a race between the chuck body and the rim of the scroll disk and rotatably supporting and locking said disk in place in the body, said body having an opening through the rim from the exterior to said race for the introduction of said balls, and means removably fitted in and closing said opening.

2. A chuck having a body carrying radially movable jaws and a rotatable scroll disk for opening and closing the jaws, differential gearing for rotating said scroll disk, balls interposed in a race between the chuck body and the rim of the scroll disk and rotatably supporting and locking said disk in place in the body, said body having a radial opening through the rim from the exterior to said race for the introduction of said balls, and means detachably held in and closing said opening.

3. A differential chuck having a body carrying radially movable jaws and a rotatable scroll disk for opening and closing the jaws, balls located in a grooved race between the chuck body and the rim of the scroll disk and rotatably supporting and locking said disk in place, a plug having a groove coinciding with said race fitted in an opening that extends radially with respect to the axis of the race in the rim of the body and a pin and extending from the front of the body and holding said plug in place.

JOSEPH C. REGAN.